J. PRICE.
NUT LOCKING DEVICE.
APPLICATION FILED NOV. 25, 1911.
1,058,386.
Patented Apr. 8, 1913.
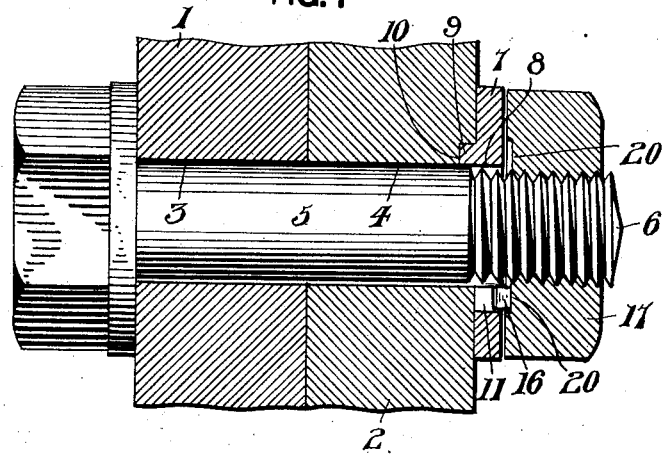
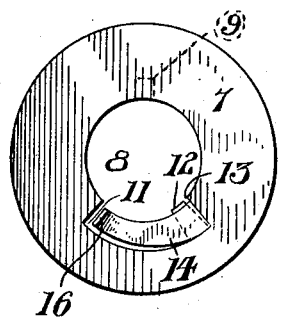
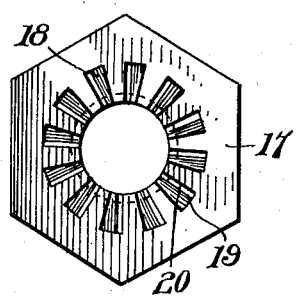
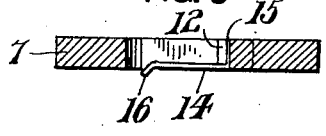
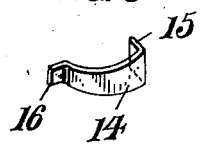
WITNESSES
INVENTOR
John Price
BY
ATTORNEYS

UNITED STATES PATENT OFFICE.

JOHN PRICE, OF JOHNSTOWN, PENNSYLVANIA.

NUT-LOCKING DEVICE.

1,058,386.  Specification of Letters Patent.  Patented Apr. 8, 1913.

Application filed November 25, 1911. Serial No. 662,359.

*To all whom it may concern:*

Be it known that I, JOHN PRICE, a citizen of the United States of America, residing at Johnstown, in the county of Cambria and State of Pennsylvania, have invented certain new and useful Improvements in Nut-Locking Devices, of which the following is a specification, reference being had therein to the accompanying drawing.

This invention relates to nut locking devices, and the objects of my invention are to provide simple and effective means, in a manner as will be hereinafter set forth, for locking a bolt upon a nut whereby the nut cannot become accidentally displaced, and to provide a nut locking device that can be advantageously used in connection with rail joints, bridges, rolling stock and structures subjected to vibration.

Further objects of my invention are to provide a nut locking device that can be easily and quickly used in connection with the ordinary type of bolt, and to accomplish the above results by a mechanical construction that is inexpensive to manufacture, durable and highly efficient for the purposes for which it is intended.

With the above and other objects in view the invention resides in the novel construction, combination and arrangement of parts to be hereinafter specifically described and then claimed.

Reference will now be had to the drawing wherein:—

Figure 1 is a longitudinal sectional view of the nut locking device. Fig. 2 is a front elevation of a detached washer. Fig. 3 is a cross sectional view of the same. Fig. 4 is an elevation of a detached nut, and Fig. 5 is a perspective view of a detached clip adapted to form part of the device.

The reference numerals 1 and 2 denote, by way of an example, two pieces of material having alining openings 3 and 4 respectively to receive a bolt 5 having a threaded end 6 protruding from the piece of material 2.

The reference numeral 7 denotes a washer having a central opening 8 providing clearance for the threaded end 6 of the bolt 5. The rear face of the washer 7, at the opening 8, is provided with a lug 9 that extends into a recess 10 formed in the outer side of the piece of material 2, at the opening 4 thereof. This lug prevents the washer 7 from rotating relatively to the piece of material 2. The wall of the opening 8 has a segment-shaped slot 11 at a point approximately opposite the lug 9. The curved wall of the slot 11 has a lip 12 forming a radially disposed slit 13. The lip 12 is of a less thickness than the washer 7 and serves as a support.

The reference numeral 14 denotes a resilient clip that is placed upon the lip or support 12 with the angle end 15 thereof engaging in the slit 13 to anchor said clip. The clip gradually tapers toward the opposite end, which is bent to provide a tooth 16.

The reference numeral 17 denotes a nut having the inner face thereof provided with radially disposed spaced recesses 18 with the bottom of each recess in the form of a ratchet tooth 19, said teeth presenting shoulders 20.

The clip 14 is curved whereby the toothed end thereof will protrude from the outer face of the washer 7. When the nut is screwed into engagement with the washer the toothed end of the clip recedes over the teeth 19 until the nut is tight and then the tooth 16 engages one of the shoulders 20 of the teeth 19.

I attach considerable importance to the manner in which the clip is anchored in the washer, as said clip can be easily removed and renewed, said washer being practically indestructible and serving for the use of many clips.

I reserve the right to make the washer of various sizes and to use the same in connection with various types and sizes of nuts.

What I claim is:—

A nut locking device comprising the combination with a bolt, of a washer mounted thereon and provided with projecting means for anchoring the same when the washer is in operative position, said washer having its inner edge cut away to provide a segment-shaped slot, a lip projecting from the curved wall of said slot and providing a slit, a resilient curved clip having one end bent and anchored at one end of said slot by said slit and lip, said clip positioned within said slot and having its front end bent outwardly to provide a tooth, a nut positioned against said washer and having its inner face provided with a circular row of independent radially extending recesses spaced from each other by plane portions of the inner face of the nut and opening at their inner ends at the inner edge of the nut and having closed outer ends terminating approximately centrally of the inner face of the nut, said recesses gradually increasing in width toward the outer edge of the nut, each of said recesses having its bottom wall formed to provide a ratchet tooth capable of being engaged by the tooth of said clip to prevent rearward rotation of the nut.

In testimony whereof I affix my signature in the presence of two witnesses.

JOHN PRICE.

Witnesses:
 GERTRUDE E. PRICE,
 EDWARD H. BALDWIN.

Copies of this patent may be obtained for five cents each, by addressing the "Commissioner of Patents, Washington, D. C."